US012794236B2

(12) United States Patent
Kuang et al.

(10) Patent No.: US 12,794,236 B2
(45) Date of Patent: Nov. 10, 2026

(54) CONTROLS ARCHITECTURE FOR FUEL CELL POWER GENERATION UNIT

(71) Applicant: AVL Mobility Technologies, Inc., Plymouth, MI (US)

(72) Inventors: Ming Kuang, Canton, MI (US); Ferit Hacioglu, Maltepe/Istanbul (TR); Shaoli Dai, Novi, MI (US)

(73) Assignee: AVL Mobility Technologies, Inc., Plymouth, MI (US)

( * ) Notice: Subject to any disclaimer, the term of this patent is extended or adjusted under 35 U.S.C. 154(b) by 123 days.

(21) Appl. No.: 19/003,629

(22) Filed: Dec. 27, 2024

(65) Prior Publication Data

US 2026/0189012 A1 Jul. 2, 2026

(51) Int. Cl.

| | |
|---|---|
| ***H02J 3/38*** | (2006.01) |
| ***H01M 8/04082*** | (2016.01) |
| ***H01M 10/42*** | (2006.01) |
| ***H01M 16/00*** | (2006.01) |
| ***H02J 3/001*** | (2026.01) |
| ***H02J 3/36*** | (2006.01) |
| *B60L 50/75* | (2019.01) |
| *B60L 58/40* | (2019.01) |
| *H02J 101/30* | (2026.01) |

(52) U.S. Cl.

CPC ........... *H02J 3/38* (2013.01); *H01M 8/04201* (2013.01); *H01M 10/425* (2013.01); *H01M 16/006* (2013.01); *H02J 3/001* (2020.01); *H02J 3/36* (2013.01); *B60L 50/75* (2019.02); *B60L 58/40* (2019.02); *H01M 2010/4271* (2013.01); *H01M 2220/20* (2013.01); *H01M 2250/20* (2013.01); *H01M 2250/402* (2013.01); *H02J 2101/30* (2026.01)

(58) Field of Classification Search

CPC ...... H02J 3/38; H02J 3/001; H02J 3/36; H02J 2101/30; H01M 8/04201; H01M 16/006; H01M 10/425; H01M 2010/4271; H01M 2220/20; H01M 2250/20; H01M 2250/402; B60L 58/40; B60L 50/75

See application file for complete search history.

(56) References Cited

U.S. PATENT DOCUMENTS

2012/0326516 A1* 12/2012 Gurunathan .............. H02J 1/00 307/43
2025/0229651 A1* 7/2025 Bari ......................... B60L 50/75

* cited by examiner

*Primary Examiner* — Adolf D Berhane
(74) *Attorney, Agent, or Firm* — Honigman LLP; Matthew H. Szalach

(57) ABSTRACT

A controls system for a power generation system includes an input layer configured to receive one or more inputs from an application, a controls layer in communication with the input layer and configured to determine and transmit control signals to control systems of the power generation unit, an output layer in communication with the controls layer and configured to receive the control signals from the controls layer and translate the control signals into output signals, and an actuator subsystem including one or more actuators configured to receive the output signals from the output layer and control the systems of the power generation unit based on the output signals.

20 Claims, 4 Drawing Sheets

CONTROLS ARCHITECTURE FOR FUEL CELL POWER GENERATION UNIT

FIELD

The present disclosure relates generally to controls architecture for fuel cell power generation unit.

BACKGROUND

This section provides background information related to the present disclosure and is not necessarily prior art.

As electrification efforts accelerate to combat climate change, fuel cell technology is increasingly being integrated into both transportation and utility industries for electrical power generation-a rapidly emerging trend. Fuel cells operate through an electrochemical process that converts the chemical energy of a fuel (commonly hydrogen) and an oxidizing agent (typically oxygen) into electricity, with water and heat as the only byproducts. This technology offers a green alternative to traditional fossil fuel engine-generators for power generation across a variety of applications, including enabling series hybrid propulsion systems for ground vehicles, locomotives, and marine applications in the transportation sector and providing direct current (DC) power as a reliable source of stationary backup power in utility industries.

In transportation applications, the high voltage (HV) DC power generated by the fuel cell system is used to drive electric propulsion systems, converting electrical energy into mechanical energy to propel vehicles, locomotives, and marine vessels. In utility applications, the system incorporates DC/AC conversion and transformers to convert HV DC power into alternating current (AC) power for consumers. The demand for HV DC power varies by application. However, the fuel cell power generation system's functions, managed by supervisory controls, remain consistent across applications. The system's power output depends on the size of the fuel cell system and the HV battery, resulting in a scalable fuel cell power generation unit

SUMMARY

One aspect of the disclosure provides a controls system and architecture for a power generation system, the controls system comprising an input layer configured to receive one or more inputs from an application, a controls layer in communication with the input layer and configured to determine and transmit control signals to control systems of the power generation unit, an output layer in communication with the controls layer and configured to receive the control signals from the controls layer and translate the control signals into output signals, and an actuator subsystem including one or more actuators configured to receive the output signals from the output layer and control the systems of the power generation unit based on the output signals.

Implementations of the disclosure may include one or more of the following optional features. In some implementations, the output layer translates the control signals into output signals that are specific to each of the one or more actuators of the actuator subsystem.

The one or more inputs may include an observer high voltage DC/DC converter, an observer low voltage DC/DC converter, an observer battery, an observer power diversion, and observer fuel cell system, an observer thermal system, or an observer tank system.

The output layer may include one or more of an output interface application, an output interface thermal system, an output interface tank system, output interface low voltage DC/DC converter, an output interface battery, an output interface power diversion system, an output interface fuel cell system, or an output interface high voltage DC/DC converter.

The one or more actuators may include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

The controls layer may include a fault management control, an operating mode management control, and an energy management control.

The input layer and the output layer may insulate the controls layer from variations in subordinate subsystems.

Another aspect of the disclosure provides a power generation system comprising a fuel cell power generator, a battery system, brake resistors, a low voltage DC/DC converter, a thermal management system, a hydrogen tank system, and a controls system comprising, an input layer configured to receive one or more inputs from an application, a controls layer in communication with the input layer and configured to determine and transmit control signals to control systems of the power generation unit, an output layer in communication with the controls layer and configured to receive the control signals from the controls layer and translate the control signals into output signals, and an actuator subsystem including one or more actuators configured to receive the output signals from the output layer and control the systems of the power generation unit based on the output signals.

Implementations of the disclosure may include one or more of the following optional features. In some implementations, the output layer translates the control signals into output signals that are specific to each of the one or more actuators of the actuator subsystem.

The one or more inputs may include an observer high voltage DC/DC converter, an observer low voltage DC/DC converter, an observer battery, an observer power diversion, and observer fuel cell system, an observer thermal system, or an observer tank system.

The output layer may include one or more of an output interface application, an output interface thermal system, an output interface tank system, output interface low voltage DC/DC converter, an output interface battery, an output interface power diversion system, an output interface fuel cell system, or an output interface high voltage DC/DC converter.

The one or more actuators may include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

The controls layer may include a fault management control, an operating mode management control, and an energy management control.

The input layer and the output layer may insulate the controls layer from variations in subordinate subsystems.

Another aspect of the disclosure provides a method comprising providing a controls system for a power generation system, the controls system comprising an input layer, a controls layer in communication with the input layer and including a fault management control, an operating mode management control, and an energy management control, an output layer in communication with the controls layer, and an actuator subsystem in communication with the output layer, obtaining, by the input layer, one or more inputs from an application, assessing, by the fault management control, the severity of any faults and communicating instructions to the operating mode management control to mitigate any faults, controlling, by the operating mode management control, the startup of the power generation system, optimizing, by the energy management control, the delivery of power from the power generation system to the application.

Implementations of the disclosure may include one or more of the following optional features. In some implementations, the application is one of a transportation application or a utility application.

The output layer may translate the control signals into output signals that are specific to each of the one or more actuators of the actuator subsystem.

The one or more inputs may include an observer high voltage DC/DC converter, an observer low voltage DC/DC converter, an observer battery, an observer power diversion, and observer fuel cell system, an observer thermal system, or an observer tank system.

The output layer may include one or more of an output interface application, an output interface thermal system, an output interface tank system, output interface low voltage DC/DC converter, an output interface battery, an output interface power diversion system, an output interface fuel cell system, or an output interface high voltage DC/DC converter.

The one or more actuators may include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

This section provides a general summary of the disclosure and is not a comprehensive disclosure of its full scope or all of its features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations and are not intended to limit the scope of the present disclosure.

Corresponding reference numerals indicate corresponding parts throughout the drawings.

DETAILED DESCRIPTION

Figure 1:
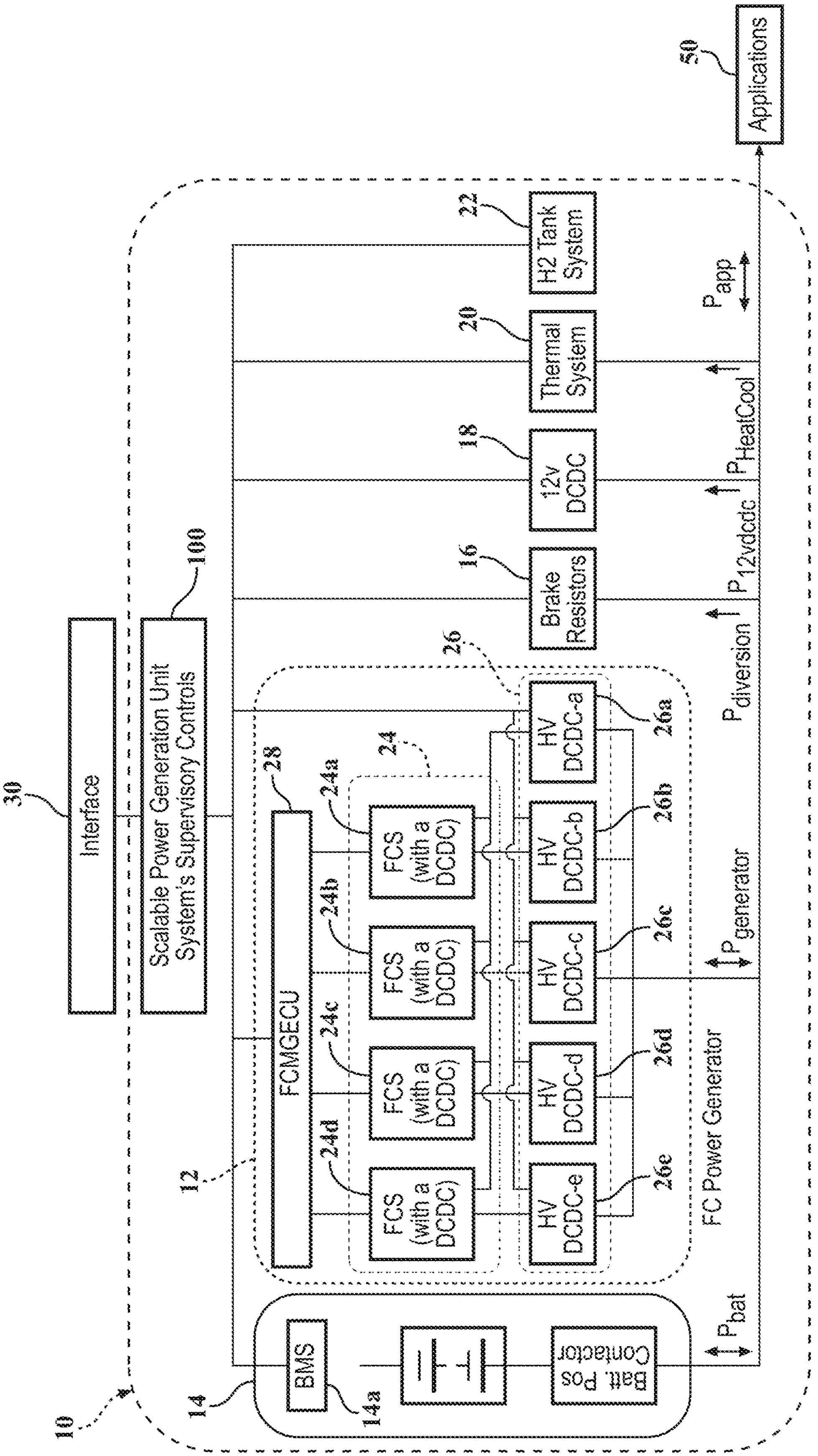
FIG. 1 is a schematic representation of a scalable fuel cell power generation unit system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a schematic representation of a scalable fuel cell power generation unit (SPGU) system 10 is generally shown. The SPGU system 10 may generate power through fuel cells that operate through an electrochemical process that converts the chemical energy of a fuel (commonly hydrogen) and an oxidizing agent (typically oxygen) into electricity, with water and heat as the only byproducts. The SPGU system 10 may be applied to a variety of applications 50. For example, in transportation applications, the HV DC power generated by the SPGU system 10 is used to drive electric propulsion systems, converting electrical energy into mechanical energy to propel vehicles, locomotives, and marine vessels. As another example, in utility applications, the SPGU system 10 incorporates DC/AC conversion and transformers to convert HV DC power into alternating current (AC) power for consumers. The SPGU system 10 includes a controls system and architecture 100 in communication with an interface 30 (e.g., display screen). The controls system 100 will be described in greater detail below. The SPGU system 10 includes a fuel cell power generator 12, a battery pack system 14, brake resistors 16, a 12V DC/DC converter 18, a thermal management system 20, and a hydrogen (H2) tank system 22.

The fuel cell power generator 12 includes one or more fuel cell systems (FCS) 24, 24*a-d* that converts hydrogen's chemical energy into electricity. The number of FCS 24 is scaled depending on the application. The fuel cell power generator 12 may include one or more HV DC/DC converters 26, 26*a-e*. The HV DC/DC converters 26, 26*a-e* may be implemented if the FCS output voltage does not match the voltage for its air compressor motor and the battery pack voltage or if the FCS 24 does not come with a DC/DC converter for fuel cell operation. The fuel cell power generator 12 may include a fuel cell system control module (FCSCM) 28, which may be implemented if the coordination and controls function for each FCS 24 is allocated out of the controls system 100.

The battery pack system 14 supplies power for fuel cell startup and ensures continuous high-voltage (HV) DC power output to various applications. The battery pack system 14 includes a battery management system (BMS) 14*a*. The brake resistors 16 dissipate excess power from a DC output bus when necessary. The 12V DC/DC converter 18 powers the controls system 100 and sensors/actuators. The thermal management system 20 is used for heating and cooling. The H2 tank system 22 stores and supplies hydrogen fuel to the FCS 24.

Figure 2:
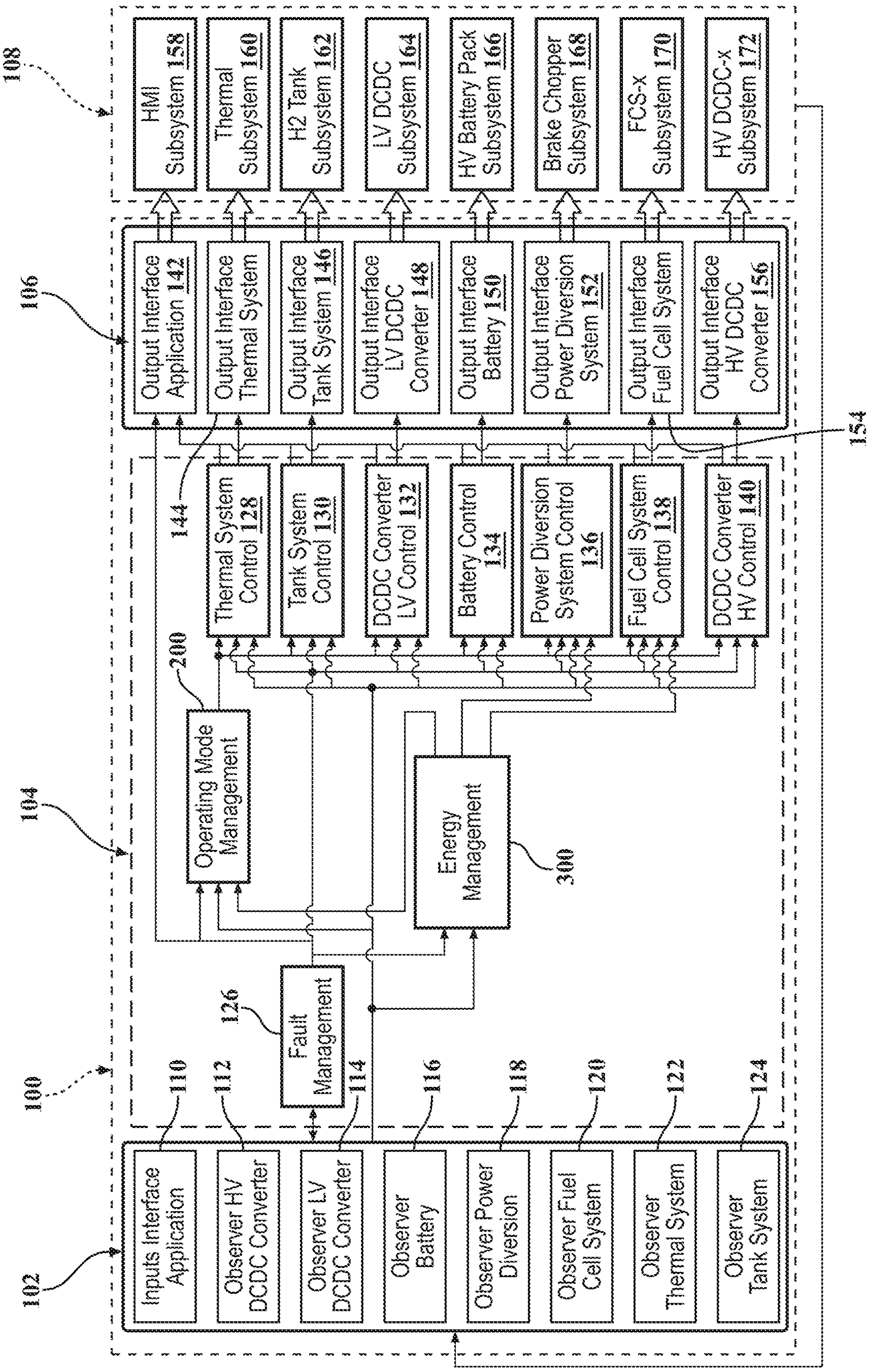
FIG. 2 is a schematic representation of a controls architecture for the scalable fuel cell power generation unit system of FIG. 1 in accordance with principles of the present disclosure.

Referring to FIG. 2, a schematic representation of the controls system 100 is generally shown. The controls system 100 manages and coordinates the power generation process of the SPGU system 10. The controls system 100 includes the input interface or input layer 102, a controls layer 104, and an output layer 106, which interface with subsystems actuators 108. The input layer 102 is designed to accommodate variations in outputs from the respective subsystems or modules, translating them into a standardized format for the downstream controls application software. The controls layer 104 is designed to control the SPGU system 10. The output layer 106 translates the outputs from the controls layer 104 into the specific formats required by each subsystem or module through the subsystems actuators 108. The input layer 102 and the output layer 106 both insulate the core controls layer 104 from the variations in hardware and software designs across components or subsystems, which allows for maximum commonality and reuse for the controls system 100. That is, in this manner, the controls system 100 can operate as a universal controls system across a variety of SPGU systems with different inputs and outputs.

The input layer 102 includes an inputs interface application 110 configured to obtain inputs from a variety of inputs, as well as feedback from the subsystems. For example, as shown in FIG. 2, the inputs may include an observer HV DC/DC converter 112, an observer low voltage (LV) DC/DC converter 114, an observer battery 116, an observer power diversion 118, and observer fuel cell system 120, an observer thermal system 122, and an observer tank system 124. These inputs are exemplary only, and a variety of other inputs may be possible based on the specific application.

Figure 3:
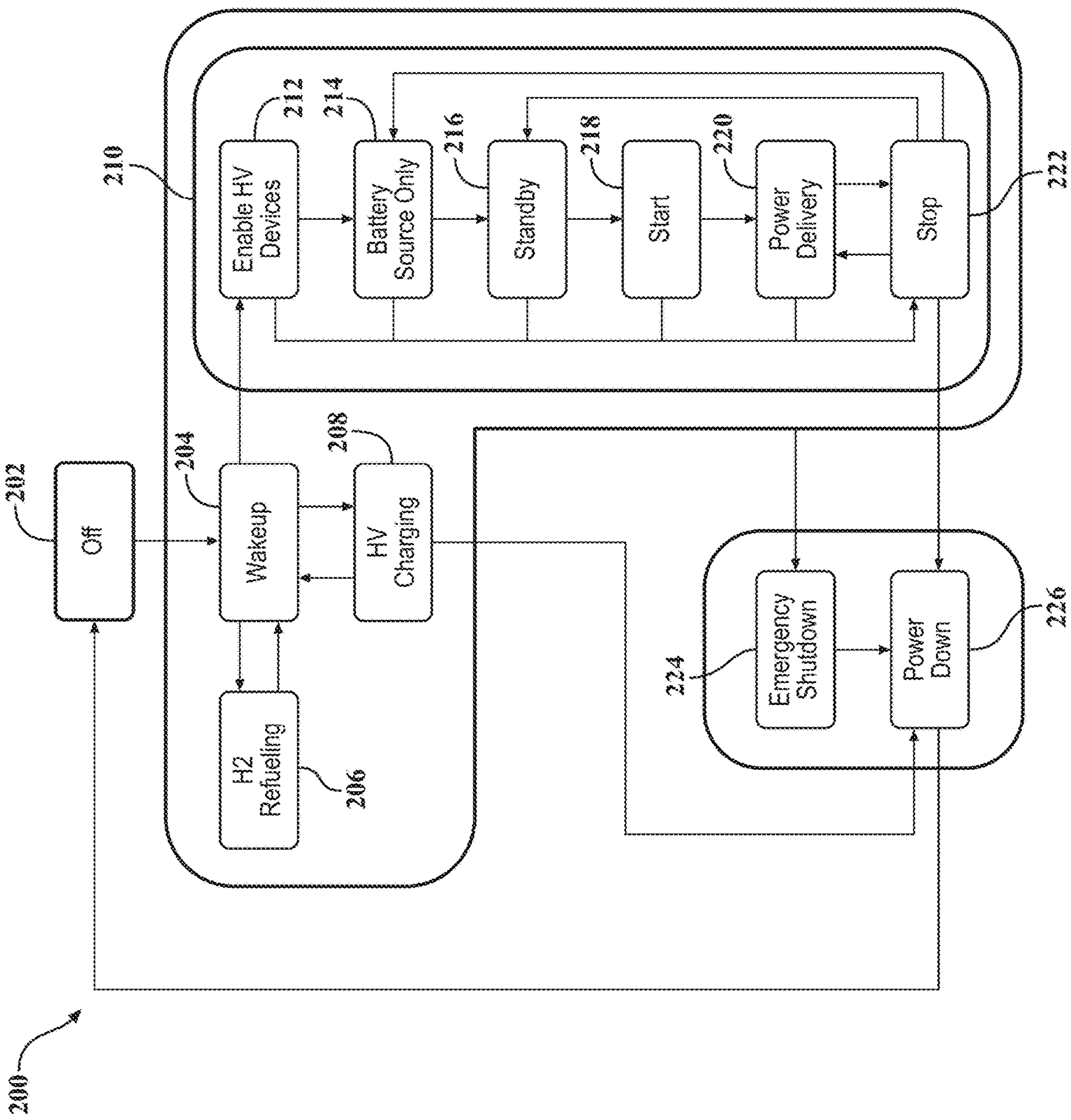
FIG. 3 is a flowchart of an operating mode management system of the controls architecture of FIG. 2.
Figure 4:
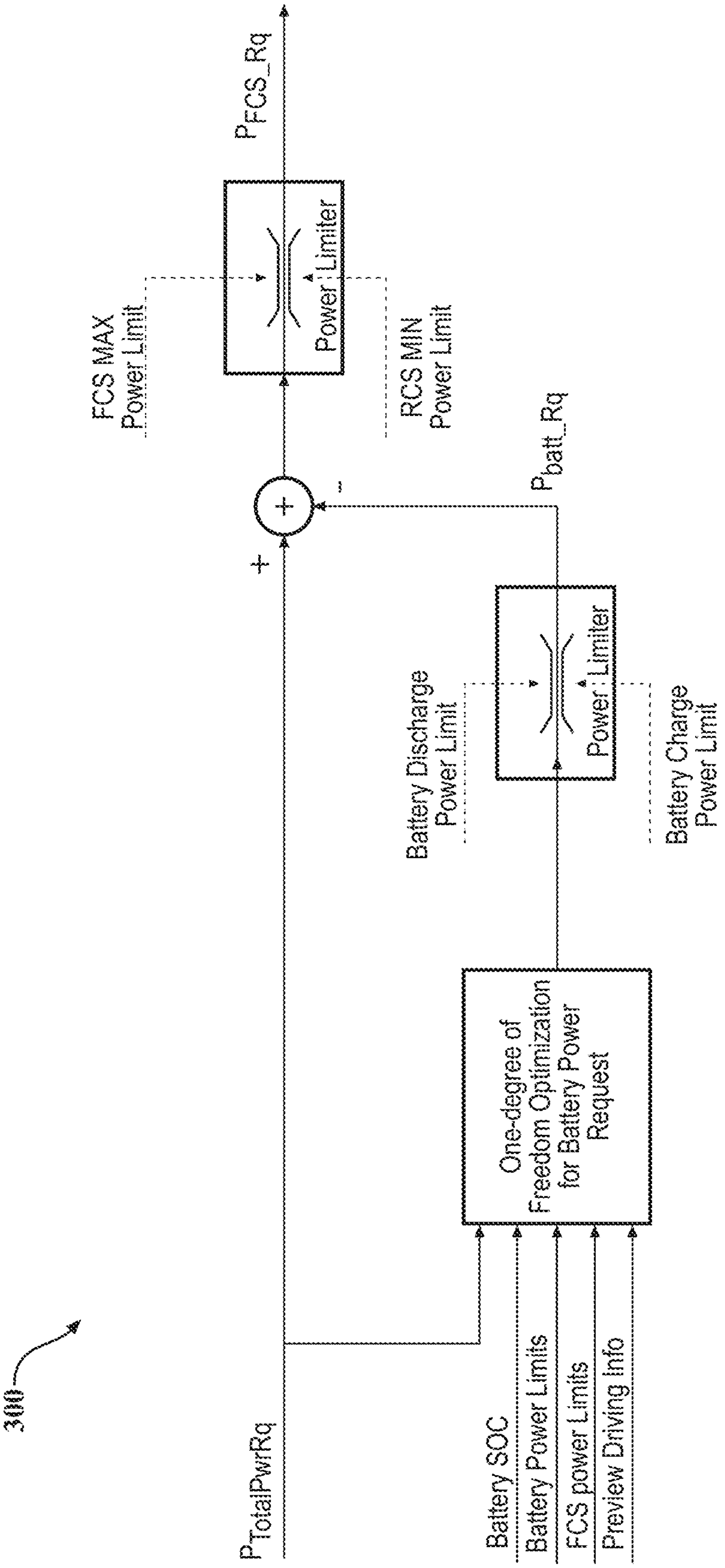
FIG. 4 is a schematic representation of an energy management system of the controls architecture of FIG. 2.

The controls layer 104 includes three core controls: fault management control 126, operating mode management control 200, and energy management control 300. The fault management control 126 assesses the severity of system faults and manages fault mitigation and limited operating strategies (LOS). The operating mode management control 200 (as shown in FIG. 3) oversees the controls system 100 operation, from startup to shutdown, including power delivery, charging, and refueling. The energy management control 300 (as shown in FIG. 4) optimally allocates the requested power between the battery 14 and the FCS 24.

Referring to FIG. 3, a schematic representation of the operating mode management (OMM) control 200 is generally shown. The OMM control 200 controls the SPGU system 10 from its wakeup to operator's requested operation, e.g., H2 refueling, HV charging, power generation, etc. The OMM control 200 is designed to satisfy operational requirements from a variety of applications.

The OMM control 200 includes an off state 202 where the SPGU system 10 is off, i.e., all modules and systems are off. The OMM control 200 includes a wakeup module 204 that latches the 12V power of the controls system 100 and activates hardware wakeup lines to modules per a wakeup trigger sent by the wakeup module 204. The OMM control 200 includes a H2 refilling module 206 that controls H2 refilling of the H2 tank system 22. The OMM control 200 includes an HV charging module 208 that coordinates with the controller for the particular application (e.g., a vehicle controller or a utility controller) to control on-board charging.

The OMM control 200 includes a power generation subsystem 210 to control the power generation functions of the SPGU system 10. The power generation subsystem 210 includes an enable HV devices module 212, which is configured to close the battery 14 contactors and enable the DC/DCs 26. The power generation subsystem 210 includes a battery source only module 214, which is configured to enable the thermal system 20 and provide HV power to applications 50 as required. The power generation subsystem 210 includes a standby module 216, which is configured to open the H2 supply valves from the H2 tank system 22 and ready the FCS 24 to start. The power generation subsystem 210 includes a start module 218, which is configured to coordinate and request the FCS 24 to start. The power generation subsystem 210 includes a power delivery module 220, which is configured to coordinate and request power generation from the fuel cell power generator 12. The power generation subsystem 210 includes a stop module 222, which is configured to coordinate and request the FCS 24 to stop, and close the H2 supply valves from the H2 tank system 22 if the FCS 24 experiences failure, or if the ignition key is off, or if FCS 24 power is no longer required by the applications 50.

The OMM control 200 includes an emergency shutdown module 224, which is configured to shut down the FCS 24, close the H2 supply valves from the H2 tank system 22, disable the DC/DCs 26, and open the battery 14 contactors. The OMM control 200 includes a power down module 226, which is configured to disable the DC/DCs 26 (if not done yet and the state of the FCS 24 equals 0x00), open the battery 14 contactors (if not done yet and the state of the FCS 24 equals 0x00), disable the thermal system 20, deactivate the hardware wakeup lines, and unlatch the 12V power of the controls system 100.

Referring to FIG. 4, a schematic representation of the energy management control 300 is generally shown. The energy management control 300 may have one degree of freedom for control optimization. In one implementation, battery power request ($P_{batt\_Rq}$) is selected as the degree of freedom. Per the governing physical equation, the fuel cell power request ($P_{FCS\_Rq}$) is calculated as follows:

$$P_{FCS_{Rq}} = \left[P_{app_{Rq}} + P_{HvAux} + (P_{LossDcdc-a} + P_{LossDcdc-b} + P_{LossDcdc-c} + P_{LossDcdc-d})\right] - P_{batt_{Rq}}$$

The battery power request ($P_{batt\_Rq}$) can be determined via one degree of freedom optimization. The optimization can be realized by off-line or on-line optimal controls, or others of choice. In some implementations, the energy management control 300 may have two or more degrees of freedom, e.g., for an engine-generator power generation system.

Referring to FIG. 2, the controls layer 104 is configured to determine and transmit one or more controls signals to the output layer 106. The controls layer 104 includes several subsystem-specific control components to bridge the core controls with its respective subsystem and coordinate and command its respective subsystems, or its sub-subsystems, as required for normal and LOS operation. For example, as shown in FIG. 2, the subsystem-specific control components may include a thermal system control 128, a tank system control 130, a DC/DC converter LV control 132, a battery control 134, a power diversion system control 136, a fuel cell system control 138, and a DC/DC converter HV control 140. The thermal system control 128 regulates the thermal system 20 to maintain the operating temperatures of subsystems and components within specified ranges. The tank system control 130 manages the supply and refueling of hydrogen of the H2 tank system 22 for safe handling. The DC/DC converter LV control 132 coordinates and commands DC/DC converter LV from the HV DC power bus to the 12V power distribution system. The battery control 134 interfaces with and coordinates the BMS 14*a*. The power diversion system control 136 manages the brake resistors 16 to dissipate excess power on the HV power bus. The fuel cell system control 138 oversees the startup, shutdown, and power delivery operations of one or multiple FCS 24. The DC/DC converter HV control 140 coordinates and commands the DC/DC converters 26 for power flow from the FCS 24 to the HV DC power bus. These controls are exemplary only, and a variety of other controls may be possible based on the specific application.

The output layer 106 is configured to receive the one or more controls signals from the controls layer 104 and translate the controls signals into actuator-specific output signals that can be interpreted by the subsystems actuators 108 to control the systems of the SPGU system 10. The output layer 106 includes several outputs such as, for example, an output interface application 142, an output interface thermal system 144, an output interface tank system 146, an output interface LV DC/DC converter 148, an output interface battery 150, an output interface power diversion system 152, an output interface fuel cell system 154, and an output interface HV DC/DC converter 156. These outputs are exemplary only, and a variety of other controls may be possible based on the specific application.

The subsystems actuators 108 is configured to receive the actuator specific output signals from the output layer 106 and implement the instructions set forth in the output signals to control the systems of the SPGU system 10. The subsystems actuators 108 include several actuators, such as, for example, a human machine interface (HMI) subsystem 158, a thermal subsystem 160, an H2 tank subsystem 162, an LV DC/DC subsystem 164, an HV battery pack subsystem 166, a brake chopper subsystem 168, an FCS-x subsystem 170, and an HV DC/DC-x subsystem 172.

The output interface application 142 translates an output signal from the controls system 104 for use by the HMI subsystem 158 to control the interface 30. The output interface thermal system 144 translates an output signal from the controls system 104 for use by the thermal subsystem 160 to control the thermal system 20. The output interface tank system 146 translates an output signal from the controls system 104 for use by the H2 tank subsystem 162 to control the H2 tank system 22. The output interface LV DC/DC converter 148 translates an output signal from the controls system 104 for use by the LV DC/DC subsystem 164 to control the 12V DC/DC converter 18. The output interface battery 150 translates an output signal from the controls system 104 for use by the HV battery pack subsystem 166 to control the battery 14. The output interface power diversion system 152 translates an output signal from the controls system 104 for use by the brake chopper subsystem 168 to control the brake resistors 16. The output interface fuel cell system 154 translates an output signal from the controls system 104 for use by the FCS-x subsystem 170 to control the FCS 24. The output interface HV DC/DC converter 156 translates an output signal from the controls system 104 for use by the HV DC/DC-x subsystem 172 to control the HV DC/DC converters 26.

In view of the foregoing, an exemplary method for operating the controls system 100 will now be described with respect to a vehicle. First, the input layer 102 obtains inputs from the vehicle (e.g., ignition key position, total wheel torque request, etc.) and feedback from all subsystems 108. Next, the fault management system 126 assesses the severity of any faults and communicates them to the OMM control 200 and other relevant controls for fault mitigation. Next, the OMM control 200 orchestrates the startup or shutdown of the SPGU system 10 by commanding the BMS 14*a* to either close or open the contactors of the battery 14 during startup or shutdown, respectively. Next, the energy management control 300, during power delivery, optimally splits the requested power between the HV battery 14 and the FCS 24, generating specific power requests for both. Next, the FCSCM 28, based on the total FCS power requested, distributes the power requested among the available FCS 24, 24*a-d* as the power request to each and delivers the requested power to the HV bus, which transmits the required power levels to each system 16-22, applications 50, and battery pack 14 if charging is required.

In parallel to the foregoing, the thermal system control 128 controls the thermal system 20 to provide necessary heating or cooling for all components and subsystems. The tank system control 130 regulates the flow of hydrogen from the H2 tank system 22 to the FCS 24 for electricity generation. The DC/DC converter HV control 140 coordinates the operation of each HV DC/DC 26 to ensure that generated power flows correctly to the HV DC power bus. The DC/DC converter LV control 132 converts HV power to 12V power for distribution. The power diversion system control 136 commands the brake resistors 16 to dissipate excess power on the HV bus during transients. Finally, the output layer 106 translates the control outputs from the subordinate coordination controls into the required formats for their respective subsystems 108, ensuring the cooperative and efficient operation of the SPGU system 10 and the delivery of the requested power to the applications 50.

This exemplary method demonstrates that this hierarchical architecture of the controls system 100 allows the three key control functions (fault management control 126, OMM control 200, and energy management control 300) to focus on the overall orchestration and command of system operations—from startup to power delivery and shutdown—while the subordinate controls manage the operation and fault handling of their respective subsystems.

The controls system 100 not only maximizes the commonality and reuse of application software but also significantly enhances the functionality and performance of power generation, especially in handling non-critical faults that do not require system shutdown. For example, in a scenario where a power generation unit includes two or more fuel cell systems that may not reach the commanded state simultaneously, the controls system 100 initiates power generation with any fuel cell system that is ready, rather than waiting for all systems to be prepared. This approach reduces the time needed to deliver power in applications where timing is crucial, such as backup power systems. Similarly, if some fuel cell systems experience faults, the three key control functions (fault management control 126, OMM control 200, and energy management control 300) can continue to command the operational fuel cell systems to generate electricity, while the subordinate controls manage the shutdown of the faulty systems. This method greatly simplifies the application software while improving overall functionality.

Accordingly, the controls system 100 includes an innovative architecture and decomposition of supervisory controls by structuring the hierarchy into three main domains: input layer 102, controls 104, and output layer 106. The input layer 102 and the output layer 106 are designed to insulate the controls 104 from variations in subordinate subsystems, enabling adaptability to different subsystems and hardware, flexibility in supplier selection, and minimal effort for integration. The hierarchical controls 106 with balanced centralization are decomposed into three key functions (fault management control 126, OMM control 200, and energy management control 300) that orchestrate system operations, supported by subordinate coordination controls that bridge the orchestration to individual subsystems, ensuring the delivery of requested functionalities, such as power generation. Thus, the controls system 100 delivers reduced complexity, maximum commonality and reuse, and increased scalability.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A controls system for a power generation system, the controls system comprising:

an input layer configured to receive one or more inputs from an application;

a controls layer in communication with the input layer and configured to determine and transmit control signals to control systems of the power generation unit;

an output layer in communication with the controls layer and configured to receive the control signals from the controls layer and translate the control signals into output signals; and an actuator subsystem including one or more actuators configured to receive the output signals from the output layer and control the systems of the power generation unit based on the output signals.

2. The controls system of claim 1, wherein the output layer translates the control signals into output signals that are specific to each of the one or more actuators of the actuator subsystem.

3. The controls system of claim 1, wherein the one or more inputs include an observer high voltage DC/DC converter, an observer low voltage DC/DC converter, an observer battery, an observer power diversion, and observer fuel cell system, an observer thermal system, or an observer tank system.

4. The controls system of claim 1, wherein the output layer includes one or more of an output interface application, an output interface thermal system, an output interface tank system, output interface low voltage DC/DC converter, an output interface battery, an output interface power diversion system, an output interface fuel cell system, or an output interface high voltage DC/DC converter.

5. The controls system of claim 1, wherein the one or more actuators include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

6. The controls system of claim 1, wherein the controls layer includes a fault management control, an operating mode management control, and an energy management control.

7. The controls system of claim 1, wherein the input layer and the output layer insulate the controls layer from variations in subordinate subsystems.

8. A power generation system comprising:

a fuel cell power generator;

a battery system;

brake resistors;

a low voltage DC/DC converter;

a thermal management system;

a hydrogen tank system; and a controls system comprising:

an input layer configured to receive one or more inputs from an application;

a controls layer in communication with the input layer and configured to determine and transmit control signals to control systems of the power generation unit;

an output layer in communication with the controls layer and configured to receive the control signals from the controls layer and translate the control signals into output signals; and an actuator subsystem including one or more actuators configured to receive the output signals from the output layer and control the systems of the power generation unit based on the output signals.

9. The power generation system of claim 8, wherein the output layer translates the control signals into output signals that are specific to each of the one or more actuators of the actuator subsystem.

10. The power generation system of claim 8, wherein the one or more inputs include an observer high voltage DC/DC converter, an observer low voltage DC/DC converter, an observer battery, an observer power diversion, and observer fuel cell system, an observer thermal system, or an observer tank system.

11. The power generation system of claim 8, wherein the output layer includes one or more of an output interface application, an output interface thermal system, an output interface tank system, output interface low voltage DC/DC converter, an output interface battery, an output interface power diversion system, an output interface fuel cell system, or an output interface high voltage DC/DC converter.

12. The power generation system of claim 8, wherein the one or more actuators include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

13. The power generation system of claim 8, wherein the controls layer includes a fault management control, an operating mode management control, and an energy management control.

14. The power generation system of claim 8, wherein the input layer and the output layer insulate the controls layer from variations in subordinate subsystems.

15. A method comprising:

providing a controls system for a power generation system, the controls system comprising:

an input layer;

a controls layer in communication with the input layer and including a fault management control, an operating mode management control, and an energy management control;

an output layer in communication with the controls layer; and an actuator subsystem in communication with the output layer;

obtaining, by the input layer, one or more inputs from an application;

assessing, by the fault management control, the severity of any faults and communicating instructions to the operating mode management control to mitigate any faults;

controlling, by the operating mode management control, the startup of the power generation system;

optimizing, by the energy management control, the delivery of power from the power generation system to the application.

16. The method of claim 15, wherein the application is one of a transportation application or a utility application.

17. The method of claim 15, wherein the output layer translates the control signals into output signals that are specific to each of the one or more actuators of the actuator subsystem.

18. The method of claim 15, wherein the one or more inputs include an observer high voltage DC/DC converter, an observer low voltage DC/DC converter, an observer battery, an observer power diversion, and observer fuel cell system, an observer thermal system, or an observer tank system.

19. The method of claim 15, wherein the output layer includes one or more of an output interface application, an output interface thermal system, an output interface tank system, output interface low voltage DC/DC converter, an output interface battery, an output interface power diversion system, an output interface fuel cell system, or an output interface high voltage DC/DC converter.

20. The method of claim 15, wherein the one or more actuators include a human machine interface subsystem, a thermal subsystem, an H2 tank subsystem, a low voltage DC/DC subsystem, a high voltage battery pack subsystem, a brake chopper subsystem, a fuel cell subsystem, and a high voltage DC/DC subsystem.

* * * * *